United States Patent
Yoon et al.

(10) Patent No.: US 12,492,367 B2
(45) Date of Patent: Dec. 9, 2025

(54) SENSOR CHIP CAPABLE OF CULTURING CELLS AND OF ANALYZING CELL-DERIVED SUBSTANCE, AND CELL ACTIVITY QUANTITATIVE ANALYSIS METHOD USING THE SAME

(71) Applicant: AJOU UNIVERSITY INDUSTRY-ACADEMIC COOPERATION FOUNDATION, Suwon-si (KR)

(72) Inventors: Hyun Chul Yoon, Seoul (KR); Kwan Young Jeong, Seongnam-si (KR); Ka Ram Kim, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 674 days.

(21) Appl. No.: 17/916,265

(22) PCT Filed: Mar. 9, 2021

(86) PCT No.: PCT/KR2021/002877
§ 371 (c)(1),
(2) Date: May 22, 2023

(87) PCT Pub. No.: WO2021/201453
PCT Pub. Date: Oct. 7, 2021

(65) Prior Publication Data
US 2025/0243445 A1    Jul. 31, 2025

(30) Foreign Application Priority Data
Apr. 2, 2020    (KR) .................. 10-2020-0040056

(51) Int. Cl.
*C12M 1/34*      (2006.01)
*C12Q 1/00*      (2006.01)
*G01N 27/26*     (2006.01)

(52) U.S. Cl.
CPC ............ *C12M 41/32* (2013.01); *C12M 41/38* (2013.01); *C12Q 1/005* (2013.01); *G01N 27/26* (2013.01)

(58) Field of Classification Search
None
See application file for complete search history.

(56) References Cited

FOREIGN PATENT DOCUMENTS

| JP | 9-500201 A | 1/1997 |
| JP | 2002-122593 A | 4/2002 |

(Continued)

OTHER PUBLICATIONS

K.Y. Inoue, et al. "Electrochemical monitoring of hydrogen peroxide released from leucocytes on horseradish peroxidase redox polymer coated electrode chip", Biosensors & Bioelectronics, 25(7): p. 1723-1728, Mar. 2010.*

(Continued)

*Primary Examiner* — J. Christopher Ball
*Assistant Examiner* — John C Ball
(74) *Attorney, Agent, or Firm* — Sughrue Mion, PLLC

(57) ABSTRACT

The present invention relates to a sensor chip capable of culturing cells and analyzing a cell-derived substance in which the sensor chip is able to electrochemically measure a concentration of hydrogen peroxide whose a secreted amount varies based on activity of immune cells, and to quantitatively analyze cell activity, based on the measured concentration. Further, the present invention relates to a method for quantitative analysis of cell activity using the sensor chip.

13 Claims, 4 Drawing Sheets

(56) References Cited

FOREIGN PATENT DOCUMENTS

| | | | |
|---|---|---|---|
| JP | 2007-187531 A | | 7/2007 |
| KR | 10-2012-0095111 A | | 8/2012 |
| KR | 10-2013-0121464 A | | 11/2013 |
| KR | 10-2014-0058729 A | | 5/2014 |
| KR | 10-2016-0032438 A | | 3/2016 |
| KR | 10-2016-0085951 A | | 7/2016 |
| KR | 10-2018-0135119 A | | 12/2018 |
| KR | 10-2020-0030321 A | | 3/2020 |
| TW | 201120443 A1 | * | 6/2011 |

OTHER PUBLICATIONS

C.-X. Lei, et al. "Immobilization of horseradish peroxidase to a nano-Au monolayer modified chitosan-entrapped carbon paste electrode for detection of hydrogen peroxide", Talanta, 59(5): p. 981-988, Apr. 2003.*

Y. Matsubara, et al. "Application of on-chip cell cultures for the detection of allergic response", Biosensors & Bioelectronics, 19(7): p. 741-747, Feb. 2004.*

C. Li, et al. "Electrochemical detection of extracellular hydrogen peroxide released from RAW 264.7 murine macrophage cells based on horseradish peroxidase-hydroxyapatite nanohybrids", Analyst, 136(6): p. 1116-1123 (Year: 2011).*

Melinda Magyar et al., "Real-Time Sensing of Hydrogen Peroxide by ITO/MWCNT/Horseradish Peroxidase Enzyme Electrode", Journal of Nanomaterials, 2016, vol. 2016, No. 2437873, pp. 1-11 (12 p. total).

* cited by examiner

SENSOR CHIP CAPABLE OF CULTURING CELLS AND OF ANALYZING CELL-DERIVED SUBSTANCE, AND CELL ACTIVITY QUANTITATIVE ANALYSIS METHOD USING THE SAME

CROSS REFERENCE TO RELATED APPLICATIONS

This application is a National Stage of International Application No. PCT/KR2021/002877, filed Mar. 9, 2021, claiming priority to Korean Patent Application No. 10-2020-0040056, filed Apr. 2, 2020.

FIELD

The present disclosure relates to a sensor chip capable of culturing cells and analyzing a cell-derived substance in which the sensor chip is able to electrochemically measure a concentration of hydrogen peroxide whose a secreted amount varies based on activity of immune cells, and to quantitatively analyze cell activity, based on the measured concentration. Further, the present disclosure relates to a method for quantitative analysis of cell activity using the sensor chip.

DESCRIPTION OF RELATED ART

A widely used method in immunogenicity identification or inflammatory response identification testing is to culture a specimen and immune cells together and then evaluate immune cell activity. The immune cell mainly used in the above method is RAW 264.7 cells as a murine monocyte macrophage cell line. These cells grow while maintaining a spherical inactive state under general culturing conditions. However, when activation thereof is made under external physical/chemical stimuli, arm-shaped pseudopodia are elongated on the cell membrane, resulting in atypical cell shape.

Conventionally, a method of identifying change in the cell shape using a microscope has been mainly used as a method of identifying whether RAW 264.7 cells are activated. However, this method is dependent on the skill of the experimenter. In this method, the cell activity cannot be quantitatively analyzed, resulting in low accuracy.

DISCLOSURE

Technical Purpose

One purpose of the present disclosure is to provide a sensor chip capable of culturing cells and analyzing a cell-derived substance in which the sensor chip is able to electrochemically measure a concentration of hydrogen peroxide whose a secreted amount varies based on activity of immune cells, and to quantitatively analyze cell activity, based on the measured concentration.

Another purpose of the present disclosure is to provide a method for quantitatively analyzing cell activity using the sensor chip capable of culturing cells and analyzing a cell-derived substance.

Technical Solution

A first aspect of the present disclosure provides a sensor chip for analysis of a cell-derived substance, wherein the sensor chip is capable of culturing cells, wherein the sensor chip comprises: a cell-culturing assembly having an upper plate having a first groove defined therein and a lower plate coupled to the upper plate and having a second groove defined therein, wherein the first and second grooves are connected to each other in a fluid-communicating manner to form a culturing space in which immune cells are cultured; a work electrode coupled to the upper plate so as to extend from a position out of the culturing space into the culturing space, wherein one end of the work electrode positioned inside the culturing space includes a reducing portion made of a carbon paste having horseradish peroxidase (HRP) fixed thereto; an auxiliary electrode coupled to the upper plate so that one end of the auxiliary electrode is positioned inside the culturing space, wherein the auxiliary electrode is spaced apart from the work electrode; and a reference electrode disposed between the upper plate and the lower plate, wherein one end of the reference electrode is positioned inside the culturing space.

In one implementation of the sensor chip, the horseradish peroxidase (HRP) induces a reduction reaction of hydrogen peroxide to generate a reduction current, wherein the reduction current value is measured using the work electrode, the auxiliary electrode and the reference electrode, wherein a hydrogen peroxide concentration is determined based on the measured reduction current value.

In one implementation of the sensor chip, the work electrode includes: a metal wiring; an insulator covering a surface of the metal wiring so as to expose one end of the metal wiring positioned inside the culturing space; an insulating pipe surrounding the insulator and the metal wiring; and the reducing portion in contact with a portion of the metal wiring not covered with the insulator, wherein the reducing portion is received in the insulating pipe.

In one implementation of the sensor chip, a surface of the second groove is modified with an extracellular matrix.

In one implementation of the sensor chip, the extracellular matrix includes at least one selected from a group consisting of collagen type I, collagen type IV, chitosan, laminin, gelatin, fibronectin, polylysine (poly-L-lysin or poly-D-lysin), polyhydroxyethylmethacrylate (pHEMA), bovin serum albumin (BSA), and Matrigel.

In one implementation of the sensor chip, the upper plate has: a through-hole through which the work electrode and the auxiliary electrode extend into the culturing space; an inlet for injecting a cell culturing liquid into the culturing space; and an outlet for discharging the cell culturing liquid from the culturing space.

In one implementation of the sensor chip, each of the upper plate and the lower plate is made of a polydimethylsiloxane (PDMS).

In one implementation of the sensor chip, surfaces of the upper plate and the lower plate facing each other are treated with atmospheric pressure plasma and then are bonded to each other via a covalent bond.

In one implementation of the sensor chip, each of the work electrode and the auxiliary electrode is detachable from the upper plate.

In one implementation of the sensor chip, the auxiliary electrode includes platinum.

In one implementation of the sensor chip, the reference electrode has a structure in which a silver/silver chloride (Ag/AgCl) electrode layer is formed on a metal substrate.

A second aspect of the present disclosure provides a method for quantitative analysis of cell activity using the sensor chip as described above, the method comprising: culturing immune cells in the cell-culturing space containing a cell-culturing liquid therein; adding an external stimulating substance to the cell-culturing space to chemically activate the immune cells; performing cyclic voltammetry (CV) on the culturing liquid in which the immune cells have been cultured and measuring a reduction current value in the CV; and measuring a hydrogen peroxide concentration based on the measured reduction current value.

In one implementation of the method, the measured reduction current value is proportional to the hydrogen peroxide concentration.

In one implementation of the method, the immune cell includes at least one selected from a group consisting of RAW 264.7 cells, I-13.35 cells, IC-21 cells, 23 ScCr cells, C8-B4 cells, J774A.1 cells, and P388D1 cells, wherein the external stimulating substance includes at least one selected from a group consisting of PMA (phorbol 12-myristate 13-acetate), LPS (lipopolysaccharides), fMLP (N-Formyl-methionyl-leucyl-phenylalanine), PPD (purified protein derivative), IFNγ (Interferon gamma), TNFα (Tumor necrosis factor) alpha), CSF1 (colony stimulating factor 1), and LTA (lipoteichoic acid).

Technical Effect

According to the present disclosure, the sensor chip that may quantitatively analyze the concentration of hydrogen peroxide produced from the activated immune cells, using an electrochemical manner using a three-electrode system. Further, the sensor chip has the cell-culturing space. Thus, the sensor chip may simultaneously perform the measurement of the hydrogen peroxide as the cell-derived substance, and the cell culturing.

Further, the manufacturing process of the sensor chip according to the present disclosure is not complicated. The sensor chip may be made of polydimethylsiloxane (PDMS), which is an easily available material, thereby enabling mass production thereof.

DETAILED DESCRIPTIONS

Figure 1:
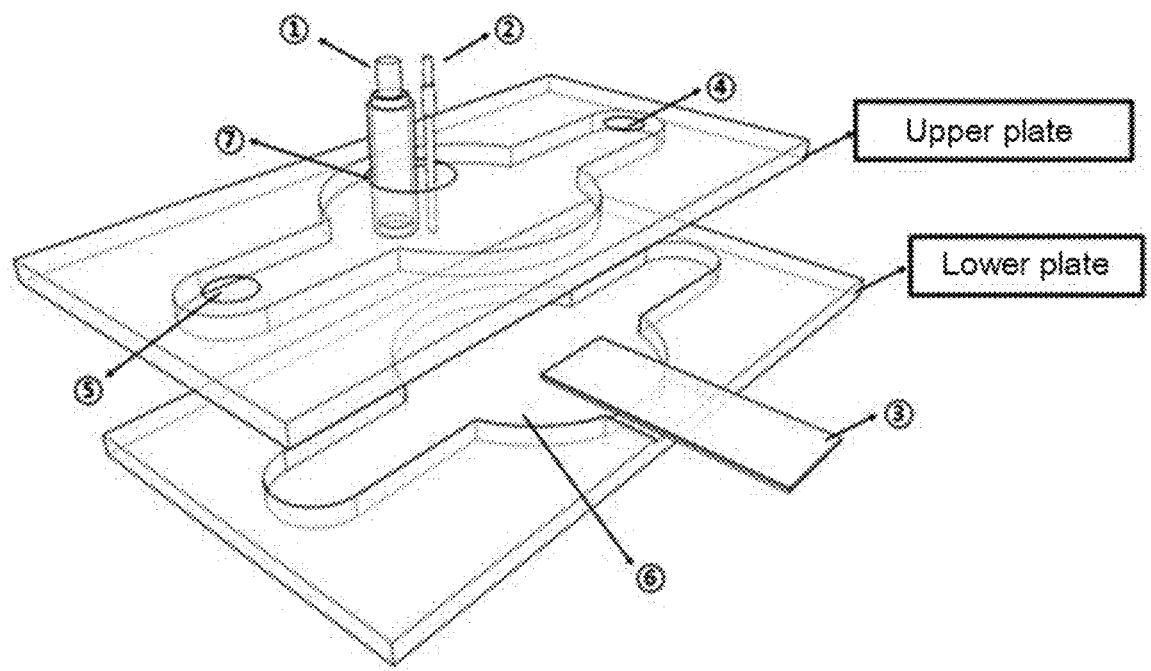
FIG. 1 is an exploded perspective view of a sensor chip capable of culturing cells and analyzing a cell-derived substance according to an embodiment of the present disclosure.

Hereinafter, an embodiment of the present disclosure will be described in detail with reference to the accompanying drawings. The present disclosure may be variously modified and may take many forms. Thus, specific embodiments will be illustrated in the drawings and described in detail herein. However, the specific embodiments are not intended to limit the present disclosure thereto. It should be understood that all changes, equivalents thereto, or substitutes therewith are included in a scope and spirit of the present disclosure. In describing the drawing, similar reference numerals are used for similar components.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or greater other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
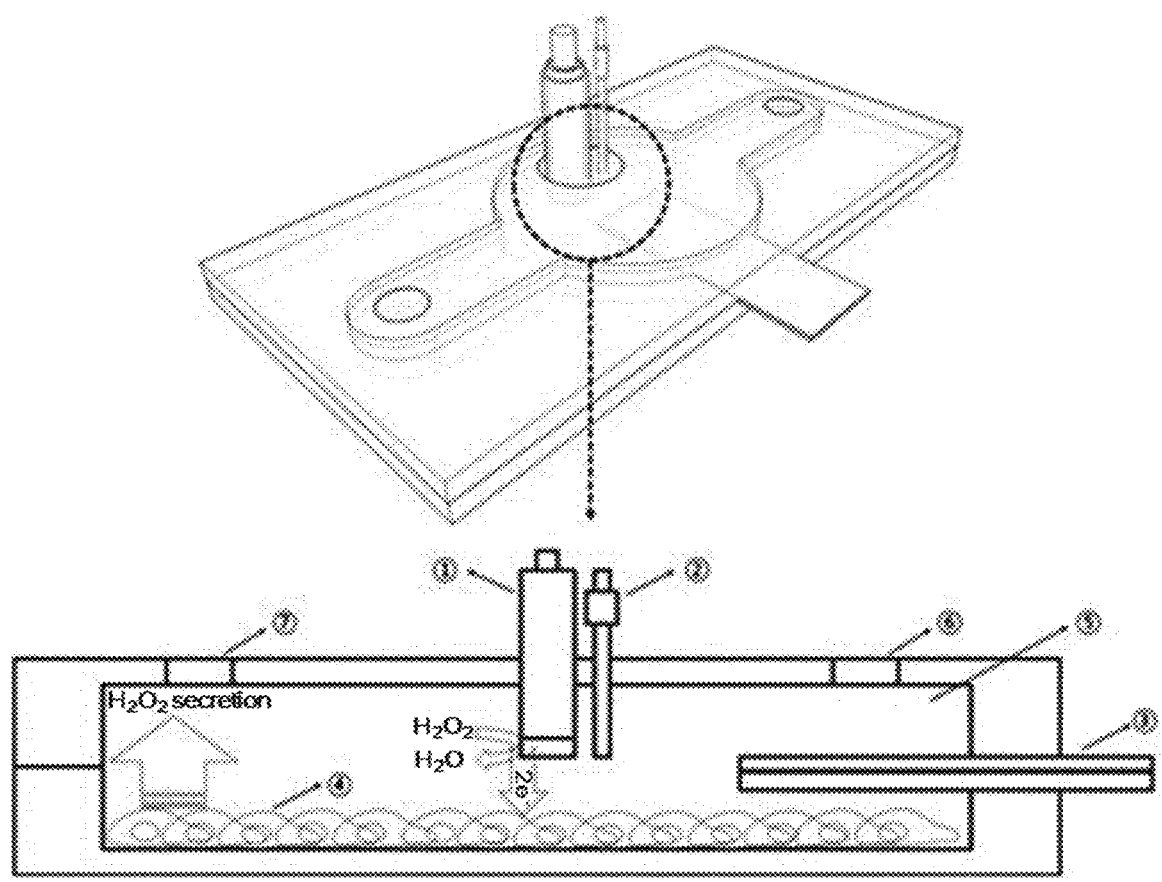
FIG. 2 is a cross-sectional view of a sensor chip capable of culturing cells and analyzing a cell-derived substance according to an embodiment of the present disclosure.

FIG. 1 is an exploded perspective view of a sensor chip capable of culturing cells and analyzing a cell-derived substance according to an embodiment of the present disclosure, and FIG. 2 is a cross-sectional view of the sensor chip capable of culturing cells and analyzing a cell-derived substance according to an embodiment of the present disclosure.

Referring to FIG. 1 and FIG. 2, the sensor chip capable of culturing cells and analyzing a cell-derived substance according to an embodiment of the present disclosure includes a cell-culturing assembly, a work electrode 1, an auxiliary electrode 2, and a reference electrode 3.

The cell-culturing assembly includes an upper plate in which a first groove is defined, and a lower plate having a second groove defined therein and coupled to the upper plate such that the first and second grooves constitute a culturing space 6 for culturing immune cells therein. In this regard, each of the upper plate and the lower plate may be made of polydimethylsiloxane (PDMS). In order to prevent leakage of a culturing liquid during cell culturing, surfaces of the upper and lower plates facing each other may be treated with atmospheric pressure plasma, and then may be coupled to each other via a covalent bond.

Specifically, the immune cells cultured in the culturing space 6 of the cell-culturing assembly may include cells which may perform metabolic activity even in an inactive state, and may secrete hydrogen peroxide out of the cells. Preferably, the immune cells cultured in the culturing space 6 of the cell-culturing assembly may include RAW 264.7 cells, which is a murine macrophage cell line. However, the present disclosure is not limited thereto. The immune cells cultured in the culturing space 6 may include I-13.35 cells, IC-21 cells, 23 ScCr cells, C8-B4 cells, J774A.1 Cells, P388D1 cells, etc.

When the immune cell is stimulated physically/chemically from external stimulus, the immune cell is activated under the stimulus. Thus, in the activated immune cell, an arm-shaped pseudopod on the cell membrane is elongated such that shape of the cell is transformed into an atypical shape. At the same time, an amount of hydrogen peroxide secreted out of the cell increases.

Therefore, the amount of hydrogen peroxide present in a cell culturing liquid in the culturing space is related to the activity of the immune cells. Thus, quantitative analysis of a concentration of hydrogen peroxide may be a measure for evaluating the immune cell activity.

In this regard, for culturing the immune cell, a surface of the second groove may be preferably modified with an extracellular matrix. In this regard, the extracellular matrix may include at least one selected from collagen type I, collagen type IV, chitosan, laminin, gelatin, ibronectin, polylysine (poly-L-lysin or poly-D-lysin), polyhydroxyethylmethacrylate (pHEMA), bovin serum albumin (BSA), and Matrigel. However, the present disclosure is not limited thereto, and a material including an extracellular matrix component may be used.

The work electrode 1 is coupled to the upper plate so as to extend from a position out of the culturing space 6 into the culturing space 6. A reducing portion made of a carbon paste to which horseradish peroxidase (HRP) is fixed is formed at one end positioned inside the culturing space 6.

Specifically, in order to electrochemically measure the concentration of hydrogen peroxide present in the cell culturing liquid, the work electrode 1 having, at one end thereof, the reducing portion made of the carbon paste to which horseradish peroxidase (HRP) is fixed may be utilized.

A heme group of the horseradish peroxidase (HRP) fixed to a surface of the work electrode 1 reduces the hydrogen peroxide to water. That is, the HRP induces a reduction reaction of hydrogen peroxide to generate a reduction current. In this regard, an amount of the reduction current increases in proportion to the amount of hydrogen peroxide. Thus, the sensor chip may measure a reduction current value using the work electrode 1, the auxiliary electrode 2 and the reference electrode 3, and thus may determine the concentration of hydrogen peroxide based on the reduction current, and may quantitatively analyze the activity of the immune cells based on the concentration of hydrogen peroxide.

Specifically, the carbon paste of the reducing portion used in the work electrode 1 is prepared using graphite powders as a main material. In this regard, the horseradish peroxidase (HRP) which induces the reduction reaction of hydrogen peroxide may be adsorbed onto the graphite powders.

For example, 50 mg of graphite powder is dispersed in 1 ml of secondary distilled water to prepare a dispersion, and then, 10 mg of horseradish peroxidase (HRP) is added to the dispersion, followed by stirring thereof at room temperature for about 5 to 7 hours. This preparation method may minimize deformation of an enzyme structure via a chemical covalent bond, thereby reducing inhibition of enzyme activity in an electrochemical reaction.

Further, when the stirring of the dispersion has been completed, moisture is removed therefrom via freeze-drying. Thus, the graphite powders to which horseradish peroxidase (HRP) is adsorbed may be prepared. Thereafter, the graphite powders are mixed with with 45 µl of mineral oil to prepare HRP-graphite powder (HRP-CPE) in a form of a paste. Then, the paste may be formed in a form as shown in FIG. 3.

Figure 3:
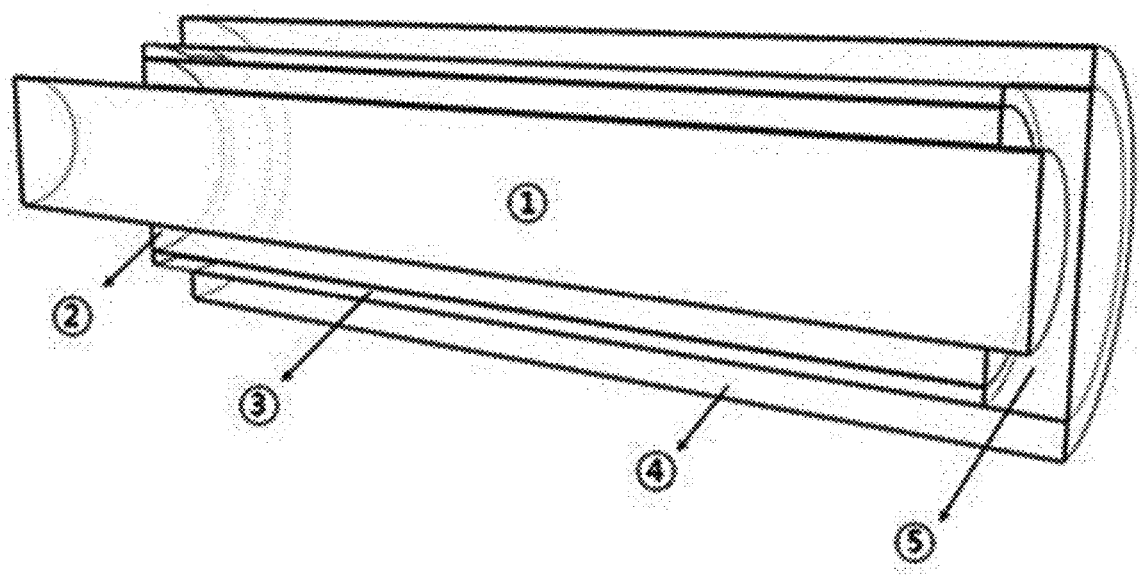
FIG. 3 is a cross-sectional view of a work electrode according to an embodiment of the present disclosure.

That is, referring to FIG. 3, the work electrode may include a metal wiring 1, an insulator 2 and 3, an insulating pipe 4, and the reducing portion 5.

One end of the metal wiring 1 may be received inside and exposed to the culturing space. The metal wiring 1 may be embodied as a copper wire. The reduction current due to electrons migrating via an enzymatic reaction on a surface of the reducing portion 5 may be measured.

The insulator 2 and 3 may cover a surface of the metal wiring 1 so as to expose one end of the metal wiring 1 located inside the culturing space. For example, The insulator 2 and 3 may be composed of a heat-shrinkable tube 2 and a Teflon tape (polytetrafluoroethylene tape) 3. The heat-shrinkable tube 2 may be made of a material such as polyolefin, silicone rubber, or fluorinated ethylene propylene.

The insulating pipe 4 may surround the insulator 2 and 3 and the metal wiring 1, and may be embodied as an acrylic pipe 4 to implement a physical shape of the work electrode.

The reducing portion 5 may be in contact with a portion of the metal wiring 1 not covered with the insulator 2 and 3, and may be located inside the insulating pipe 4, and may reduce the hydrogen peroxide to water based on an enzymatic reaction.

Specifically, the work electrode may be manufactured by inserting the copper wire 1 into the heat shrinkable tube such that the copper wire 1 is surrounded with the heat shrinkable tube 2 to perform a first insulation work; then wrapping the Teflon tape 3 with the acrylic pipe 4 having an inner diameter corresponding to an outer diameter of the Teflon tape 3 to perform a second insulation work such that a length of 1 mm of a distal end of the acrylic pipe 4 does not contact the Teflon tape 3; then filling the carbon paste 5, that is, the HRP-graphite powders in the form of the paste into a space defined between the distal end of the acrylic pipe 4 and the copper wire 1; and then grinding an end surface with an oily paper to make the surface smooth.

Referring back to FIG. 1 and FIG. 2, the auxiliary electrode 2 is coupled to the upper plate such that a portion thereof is located inside the culturing space 6, and the auxiliary electrode 2 is spaced apart from the work electrode 1. The auxiliary electrode 2 may be made of a platinum, and may be formed into various shapes to increase a surface area thereof. In an embodiment of the present disclosure, the auxiliary electrode 2 may be embodied as a platinum electrode in a form of a conductive wire.

As shown in FIG. 1 and FIG. 2, the upper plate has a through-hole 7 defined therein through which the work electrode 1 and the auxiliary electrode 2 extend into the culturing space 6, an inlet 4 for injecting the cell culturing liquid into the culturing space, and an outlet 5 for discharging the cell culturing liquid from the culturing space. The work electrode 1 and the auxiliary electrode 2 may be constructed to be detachable from the upper plate.

The reference electrode 3 is disposed between the upper plate and the lower plate, and one end of the reference electrode 3 is positioned inside the culturing space 6. The reference electrode 3 may have a structure in which a silver/silver chloride (Ag/AgCl) electrode layer is formed on a metal substrate.

For example, a gold electrode as the metal substrate is washed with a piranha solution as a mixture of hydrogen peroxide and sulfuric acid (v/v, 1:4) for about 10 minutes to remove impurities on a surface thereof. The piranha solution is removed with secondary distilled water. Then, silver/silver chloride (Ag/AgCl) ink is smeared on the surface of the gold electrode, and then heat-treatment is performed thereon at a temperature of 120 to 130° C. for about 1 to 2 hours. Thus, the reference electrode 3 may be manufactured. In this regard, the metal substate of the silver/silver chloride pseudo reference electrode is not limited to the gold electrode. Any metal substrate having conductivity may be used as the metal substate of the silver/silver chloride pseudo reference electrode.

According to the present disclosure, the sensor chip that may quantitatively analyze the concentration of hydrogen peroxide produced from the activated immune cells, using an electrochemical manner using a three-electrode system. Further, the sensor chip has the cell-culturing space. Thus, the sensor chip may simultaneously perform the measurement of the hydrogen peroxide as the cell-derived substance, and the cell culturing.

Further, the manufacturing process of the sensor chip according to the present disclosure is not complicated. The sensor chip may be made of polydimethylsiloxane (PDMS), which is an easily available material, thereby enabling mass production thereof.

In one example, in another aspect of the present disclosure, there is proposed a method for quantitative analysis of cell activity using the sensor chip for analysis of the cell-derived substance as described above.

The method for quantitative analysis of the cell activity according to an embodiment of the present disclosure includes culturing immune cells in the cell-culturing space, adding an external stimulating substance to the cell-culturing space to chemically activate the immune cells, performing a cyclic voltammetry on a liquid in which the immune cells have been cultured and measuring a reduction current value in the cyclic voltammetry, and measuring a hydrogen peroxide concentration based on the measured reduction current value.

First, the step of culturing the immune cells in the cell-culturing space is performed. In this regard, the immune cells may include at least one selected from collagen type I, collagen type IV, chitosan, laminin, gelatin, fibronectin, polylysine (poly-L-lysin or poly-D-lysin), polyhydroxyethylmethacrylate (pHEMA), bovin serum albumin (BSA), and Matrigel. Preferably, the immune cells may include RAW 264.7 cells as a murine macrophage cell line.

Specifically, RAW 264.7 cells, that is, a murine macrophage cell line as the immune cells were inoculated into the cell-culturing space. Dulbecco's modified eagle medium (DMEM), 10% fetal bovine serum, and 5% penicillin streptomycin were added to the culturing space. The culturing of the cells was performed at 37° C. under a 5% $CO_2$ concentration condition.

Next, the external stimulating substance was added to the cell-culturing space to chemically activate the immune cells. In this regard, the external stimulating substance may include at least one selected from PMA (phorbol 12-myristate 13-acetate), LPS (lipopolysaccharides), fMLP (N-Formylmethionyl-leucyl-phenylalanine), PPD (purified protein derivative), IFNγ (Interferon gamma), TNFα (Tumor necrosis factor alpha), CSF1 (colony stimulating factor 1) and LTA (lipoteichoic acid). Most preferably, PMA (phorbol 12-myristate 13-acetate) may be used as the external stimulating substance.

PMA acts as a strong tumor promoter, and is a chemical substance that induces cell growth, differentiation, and immune response when the PMA is added to the culturing liquid. When the external stimulating substance such as the PMA is added to the culturing liquid, the immune cells recognize the external stimulating substance as an external stimulus such that the activation of the cells is induced.

Next, a step of performing the cyclic voltammetry (CV) on the immune cell culturing liquid may be performed.

Due to the addition of the external stimulating substance to the immune cell culturing liquid, the amount of the activated immune cells increases, and thus the concentration of the secreted hydrogen peroxide increases in proportion to the amount of the activated immune cells. Therefore, the method performs the cyclic voltammetry (CV) on the cell culturing liquid as a sample. In this CV, the HRP fixed to the work electrode reduces the hydrogen peroxide to water to generate migrating electrons, and the reduction current value due to the migrating electrons is measured. Thus, the concentration of the hydrogen peroxide is determined based on the measured reduction current value. In this regard, a measurement voltage range of CV may be in a range of 0 V to −1 V, and the reduction current value may be obtained at −400 mV.

Next, the step of measuring the hydrogen peroxide concentration based on the reduction current value as measured in the CV method is executed. In this regard, the measured reduction current value may be proportional to the hydrogen peroxide concentration. Thus, the hydrogen peroxide concentration may be quantitatively analyzed based on the reduction current value measured in the CV method. Thus, the cell activity may be quantitatively analyzed based on the hydrogen peroxide concentration.

Hereinafter, various Examples and Experimental Examples of the present disclosure will be described in detail. However, the following Examples are only some examples of the present disclosure, and the present disclosure should not be construed as being limited to the following Examples.

Example

After introducing the sensor chip into an autoclave, the sensor chip was autoclaved at a temperature of 120° C. for 12 hours. Thereafter, RAW 264.7 cells as a murine macrophage cell line were inoculated into a cell culturing compartment containing the culturing liquid of the sterilized sensor chip, and then were cultured for 24 hours to adhere the cells to a surface of the culturing compartment. In this regard, Dulbecco's modified eagle medium (DMEM), 10% fetal bovine serum, and 5% penicillin streptomycin were added to the culturing liquid, and then culturing of the cells was carried out at 37° C., and under a 5% $CO_2$ concentration condition.

Figure 4:
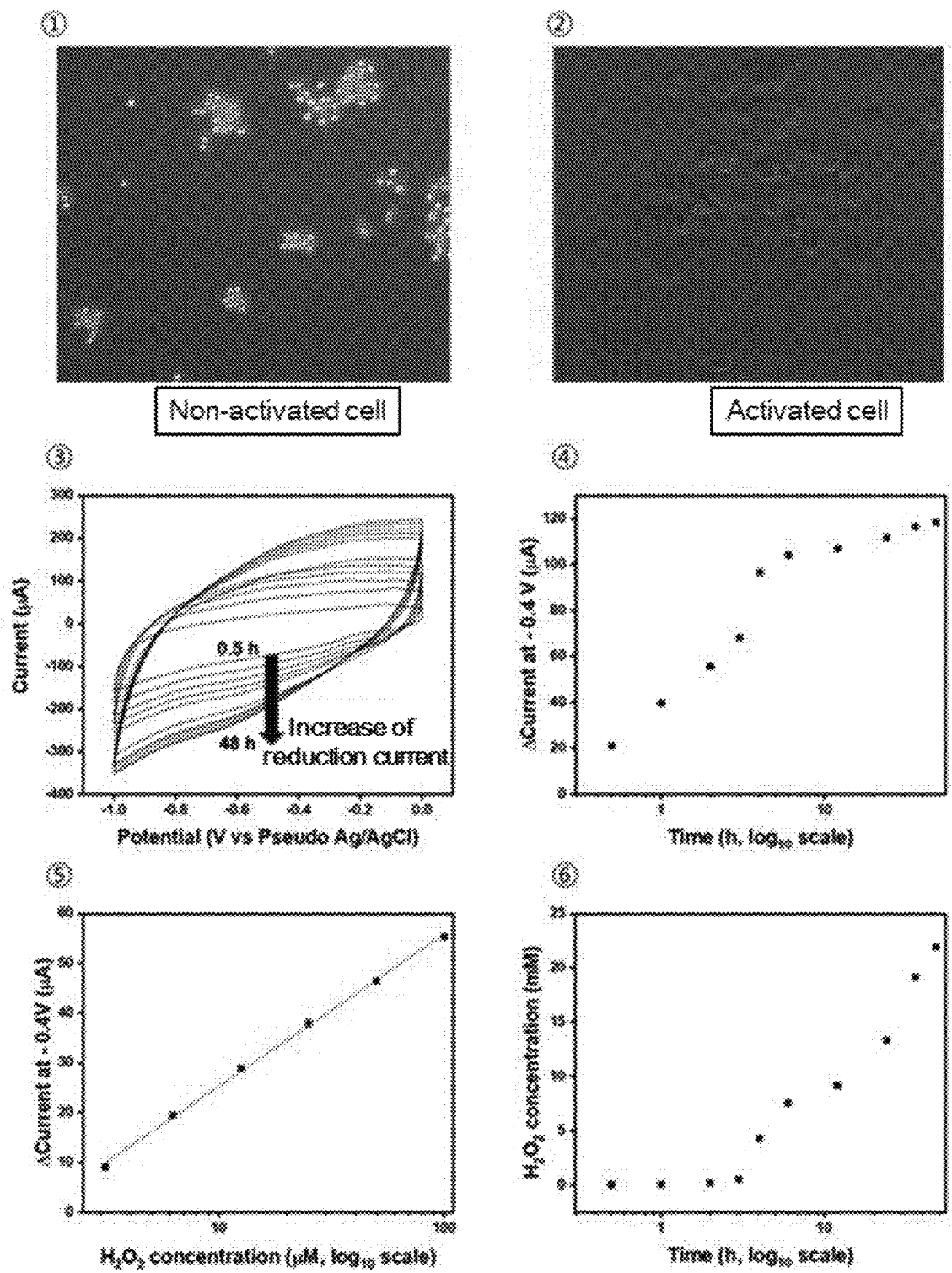
FIG. 4 shows a result of identifying whether or not a cell is activated after PMA treatment, using the sensor chip according to an embodiment of the present disclosure.

After identifying that the cells were adhered to the surface of the culturing compartment, 16 μM of PMA was added to the culturing liquid to chemically activate the cells, and change in the cell shape was observed (FIGS. 4-1 and 4-2). In this regard, PMA used as the chemical stimulant acts as a strong tumor promoter and is a chemical that induces cell growth, differentiation, and immune response when the PMA is added to the culturing liquid. When the external stimulating substance such as the PMA is added to the culturing liquid, the immune cells recognize the external stimulating substance as an external stimulus such that the activation of the cells is induced.

Further, after the PMA treatment, the amount of the activated cells induced by the PMA increases over time. Based on the determination that the amount of secreted hydrogen peroxide increases in proportion to the amount of the activated cells, the cyclic voltammetry (CV) was performed on the culturing liquid in which the cells have been cultured to measure the hydrogen peroxide concentration. In this regard, a measurement voltage range of CV was in a range of 0 V to −1 V, and the reduction current value was obtained at −400 mV.

FIG. 4 shows a result of identifying whether or not a cell is activated after PMA treatment, using the sensor chip according to an embodiment of the present disclosure.

Referring to FIGS. 4-1 and 4-2 which show the cell shape change after the PMA treatment, it may be identified that the cell shape changed into an atypical shape as pseudopods were generated in the cytoplasm after the PMA treatment (see FIG. 4-2).

Next, referring to FIGS. 4-3 and 4-4 showing the results of measuring the hydrogen peroxide concentration in the cell culturing liquid using the CV, it may be identified that the reduction current increases as the amount of hydrogen peroxide increases over time. Based on this result, quantitative analysis of hydrogen peroxide actually secreted from the activated RAW 264.7 cells was performed.

For this purpose, a calibration curve (FIG. 4-5) was obtained based on the CV results measured while hydrogen peroxide having varying concentrations was added to the cell culturing liquid. A CV result on the actual cell culturing liquid as a sample was applied to the calibration curve. Thus, a graph of the concentration of hydrogen peroxide over time after the PMA treatment was obtained (FIG. 4-6).

As a result, it may be identified that when a certain period of time has elapsed after the PMA inoculation, the RAW 264.7 cells are activated by PMA, and thus the concentration of hydrogen peroxide secreted from the cells also increases in proportion to the amount of the activated cells.

Therefore, it may be identified that the sensor chip for the analysis of the cell-derived substance according to the embodiment of the present disclosure may be used to quantitatively analyze whether the immune cells are activated.

Although the present disclosure has been described above with reference to the preferred embodiments of the present disclosure, those skilled in the art may variously modify and change the present disclosure without departing from the spirit and scope of the present disclosure as described in the claims below.

What is claimed is:

1. A sensor chip for analysis of a cell-derived substance, wherein the sensor chip is capable of culturing cells, wherein the sensor chip comprises:
    a cell-culturing assembly having an upper plate having a first groove defined therein and a lower plate coupled to the upper plate and having a second groove defined therein, wherein the first and second grooves are connected to each other in a fluid-communicating manner to form a culturing space in which immune cells are cultured;
    a work electrode coupled to the upper plate so as to extend from a position out of the culturing space into the culturing space, wherein one end of the work electrode positioned inside the culturing space includes a reducing portion made of a carbon paste having horseradish peroxidase (HRP) fixed thereto;
    an auxiliary electrode coupled to the upper plate so that one end of the auxiliary electrode is positioned inside the culturing space, wherein the auxiliary electrode is spaced apart from the work electrode; and
    a reference electrode disposed between the upper plate and the lower plate, wherein one end of the reference electrode is positioned inside the culturing space,
    wherein the work electrode includes:
    a metal wiring,
    an insulator covering a surface of the metal wiring so as to expose one end of the metal wiring positioned inside the culturing space,
    an insulating pipe surrounding the insulator and the metal wiring, and
    the reducing portion in contact with a portion of the metal wiring not covered with the insulator, wherein the reducing portion is received in the insulating pipe.

2. The sensor chip of claim 1, wherein the horseradish peroxidase (HRP) induces a reduction reaction of hydrogen peroxide to generate a reduction current,
    wherein the reduction current value is measured using the work electrode, the auxiliary electrode and the reference electrode,
    wherein a hydrogen peroxide concentration is determined based on the measured reduction current value.

3. The sensor chip of claim 1, wherein a surface of the second groove is modified with an extracellular matrix.

4. The sensor chip of claim 3, wherein the extracellular matrix includes at least one selected from a group consisting of collagen type I, collagen type IV, chitosan, laminin, gelatin, fibronectin, polylysine (poly-L-lysin or poly-D-lysin), polyhydroxyethylmethacrylate (pHEMA), bovin serum albumin (BSA), and Matrigel.

5. The sensor chip of claim 1, wherein the upper plate has:
    a through-hole through which the work electrode and the auxiliary electrode extend into the culturing space;
    an inlet for injecting a cell culturing liquid into the culturing space; and
    an outlet for discharging the cell culturing liquid from the culturing space.

6. The sensor chip of claim 1, wherein each of the upper plate and the lower plate is made of a polydimethylsiloxane (PDMS).

7. The sensor chip of claim 1, wherein surfaces of the upper plate and the lower plate facing each other are treated with atmospheric pressure plasma and then are bonded to each other via a covalent bond.

8. The sensor chip of claim 1, wherein each of the work electrode and the auxiliary electrode is detachable from the upper plate.

9. The sensor chip of claim 1, wherein the auxiliary electrode includes platinum.

10. The sensor chip of claim 1, wherein the reference electrode has a structure in which a silver/silver chloride (Ag/AgCl) electrode layer is formed on a metal substrate.

11. A method for quantitative analysis of cell activity using the sensor chip according to claim 1, the method comprising:
    culturing immune cells in the cell-culturing space containing a cell-culturing liquid therein;
    adding an external stimulating substance to the cell-culturing space to chemically activate the immune cells;
    performing cyclic voltammetry (CV) on the culturing liquid in which the immune cells have been cultured and measuring a reduction current value in the CV; and
    measuring a hydrogen peroxide concentration based on the measured reduction current value.

12. The method of claim 11, wherein the measured reduction current value is proportional to the hydrogen peroxide concentration.

13. The method of claim 11, wherein the immune cell includes at least one selected from a group consisting of RAW 264.7 cells, I-13.35 cells, IC-21 cells, 23 ScCr cells, C8-B4 cells, J774A.1 cells, and P388D1 cells,
    wherein the external stimulating substance includes at least one selected from a group consisting of PMA (phorbol 12-myristate 13-acetate), LPS (lipopolysaccharides), fMLP (N-Formylmethionyl-leucyl-phenyl-alanine), PPD (purified protein derivative), IFNγ (Interferon gamma), TNFα (Tumor necrosis factor) alpha), CSF1 (colony stimulating factor 1) and LTA (lipoteichoic acid).

* * * * *